United States Patent
Fan et al.

(10) Patent No.: US 12,543,177 B2
(45) Date of Patent: Feb. 3, 2026

(54) METHOD AND APPARATUS FOR SUPPORTING MORE USERS IN A MULTICAST GROUP

(71) Applicant: Telefonaktiebolaget LM Ericsson (publ), Stockholm (SE)

(72) Inventors: Rui Fan, Beijing (CN); Erik Stare, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 357 days.

(21) Appl. No.: 18/033,050

(22) PCT Filed: Aug. 30, 2021

(86) PCT No.: PCT/CN2021/115384
§ 371 (c)(1),
(2) Date: Apr. 20, 2023

(87) PCT Pub. No.: WO2022/083290
PCT Pub. Date: Apr. 28, 2022

(65) Prior Publication Data
US 2023/0397201 A1  Dec. 7, 2023

(30) Foreign Application Priority Data
Oct. 21, 2020  (WO) ................ PCT/CN2020/122417

(51) Int. Cl.
*H04W 72/1273* (2023.01)
*H04L 1/1812* (2023.01)

(52) U.S. Cl.
CPC ....... *H04W 72/1273* (2013.01); *H04L 1/1812* (2013.01)

(58) Field of Classification Search
CPC .......................... H04W 72/1273; H04L 1/1812
(Continued)

(56) References Cited

U.S. PATENT DOCUMENTS 11,985,660 B2 * 5/2024 Jung .................... H04W 72/569
2011/0243015 A1 * 10/2011 Lim ....................... H04L 5/0098
370/252
(Continued)

FOREIGN PATENT DOCUMENTS

| CN | 111585727 A | 8/2020 |
| CN | 111670597 A | 9/2020 |

OTHER PUBLICATIONS

International Search Report and Written Opinion with Transmittal dated Nov. 25, 2021 issued in International Patent Application No. PCT/CN2021/115384 (10 pages).
(Continued)

*Primary Examiner* — Anthony Mejia
(74) *Attorney, Agent, or Firm* — Sonoda & Kobayashi Intellectual Property Law; Sarvajit S. Patil

(57) ABSTRACT

Various embodiments of the present disclosure provide a method implemented at a terminal device in a PTM group. The method comprises receiving a message from a network node. The message indicates at least one of: delay information for a Hybrid Automatic Repeat request (HARQ) feedback for a Point to Multipoint (PTM) transmission for the terminal device, a Physical Downlink Shared Channel (PDSCH) aggregation factor for the terminal device, and a HARQ feedback reporting mode for the PTM transmission for the terminal device. The method further comprises determining whether to transmit the HARQ feedback for the PTM transmission based on the message, and/or determining timing information for transmitting the HARQ feedback for the PTM transmission based on the message.

19 Claims, 10 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2017/0353273 A1 | 12/2017 | Zhang et al. | |
| 2019/0149365 A1* | 5/2019 | Chatterjee | H04W 76/11 |
| | | | 370/329 |
| 2019/0306878 A1* | 10/2019 | Zhang | H04L 1/1812 |
| 2019/0327680 A1 | 10/2019 | Xu et al. | |
| 2020/0099476 A1 | 3/2020 | Park | |
| 2020/0106566 A1* | 4/2020 | Yeo | H04L 1/1812 |
| 2020/0274660 A1 | 8/2020 | Xiong et al. | |
| 2021/0105808 A1* | 4/2021 | Lei | H04L 5/0051 |
| 2022/0400506 A1* | 12/2022 | Yang | H04L 5/0055 |
| 2023/0025106 A1* | 1/2023 | Yang | H04L 1/1861 |
| 2023/0179343 A1* | 6/2023 | Navrátil | H04L 1/1896 |
| | | | 370/328 |
| 2023/0396356 A1* | 12/2023 | Pauli | H04W 24/10 |
| 2025/0089045 A1* | 3/2025 | Zhu | H04L 1/1864 |

OTHER PUBLICATIONS

Ericsson, "Feature lead summary #2 for Scheduling of multiple DL/UL transport blocks for LTE-MTC", R1-1913371, 3GPP TSG-RAN WG1 Meeting #99, Reno, USA, Nov. 18-22, 2019 (19 pages).
European Patent Office, "Extended European Search Report", issued in European Patent Application No. 21 881 709.6, which is a counterpart of U.S. Appl. No. 18/033,050, issued on Aug. 14, 2024, 8 pages.

* cited by examiner

METHOD AND APPARATUS FOR SUPPORTING MORE USERS IN A MULTICAST GROUP

CROSS REFERENCE TO RELATED APPLICATIONS

This application is a 35 U.S.C. § 371 National Stage of International Patent Application No. PCT/CN2021/115384, filed Aug. 30, 2021, which claims priority to International Patent Application No. PCT/CN2020/122417, filed Oct. 21, 2020, which is incorporated by this reference.

FIELD OF THE INVENTION

The present disclosure generally relates to communication networks, and more specifically, to Point to Multipoint (PTM) transmission.

BACKGROUND

This section introduces aspects that may facilitate a better understanding of the disclosure. Accordingly, the statements of this section are to be read in this light and are not to be understood as admissions about what is in the prior art or what is not in the prior art.

Point to Multipoint (PTM) transmission, which may also be referred to as multicast/broadcast transmission, has been supported in Long Term Evolution (LTE). The fifth generation mobile wireless communication system (5G) or new radio (NR) only supports unicast transmission in Release 15 and Release 16. Since it is very useful for some applications, for example, Network Security Public Safety (NSPS), or Vehicle-to-everything (V2X) etc., it's necessary to study broadcast/multicast transmission in Release 17 for NR.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

There are two different ways to support multicast/broadcast in Long Term Evolution (LTE), Single Cell Point-To-Multipoint (SC-PTM) or Multimedia Broadcast Multicast Services (MBMS). Whatever which method, there is no feedback from user equipment (UE) to network. The advantage of this method is simple. The disadvantage is that the spectrum efficiency is very low. This is because network does not know if UE receive a packet or not. In order to ensure reliability, it has to use very low coding rate and may also repeat transmission for several times.

For some PTM applications, e.g. NSPS or V2X, there is requirement on Quality of Service (QoS), i.e. less than 1% packet error rate with a delay budget of X ms. Therefore, it is necessary to support Hybrid Automatic Repeat reQuest (HARQ) feedback for multicast service in New Radio (NR). Otherwise, the spectrum efficiency to support multicast service could be very low.

To conquer this issue, enable HARQ feedback for multicast transmission has been proposed for NR. For unicast, although there could be quite many Radio Resource Control (RRC)_Connected users in a cell, the (Next) Generation base station (gNB) will not schedule them at the same time, therefore, they will not transmit HARQ feedback at the same time. For example, when there are M (e.g. 100) RRC_Connected users, usually only a few users, N (e.g. 8) are scheduled at the same time and thus need to send HARQ feedback at the same time. Therefore N (e.g. 8) Physical Uplink Control Channel (PUCCH) resources can satisfy requirement of M (e.g. 100) users. Different from unicast, when one multicast Physical Downlink Shared CHannel (PDSCH) is scheduled, all M (e.g. 100) users in multicast group will receive the PDSCH, then at the same time all users in multicast group need to send HARQ feedback. This means M PUCCH resource are needed.

The problem is that when the number of users in a multicast group is large, the required PUCCH resource could be quite large as well. As Uplink (UL) resource is shared between PUCCH and Physical Uplink Shared Channel (PUSCH), PUSCH throughput will be affected if too much resource is allocated to PUCCH. PUCCH resource limitation issue might be encountered when many users in a multicast group are supported.

As illustrated above, it may be not a problem to support many RRC_Connected users for unicast transmission. This is because although there are many RRC_Connected users in system, at one time, only some of them will be scheduled. Further, not all of the scheduled active users need to send HARQ feedback at the same time, since due to the nature of unicast, these users can be scheduled with different resources, which are also often separated in time. Due to the two reasons, there might be no PUCCH resource limitation issue for unicast transmission.

However, for the case of PTM transmission (multicast transmission) of both PDCCH and PDSCH, one PDSCH will be received by all users in multicast group and therefore they need to send HARQ feedback at the same time since the PDSCH-to-acknowledgement/negative-acknowledgement (ACK/NACK) delay field in Downlink Control Indicator (DCI) apply to all users that receive this multicast PDCCH. Then the required PUCCH resources for HARQ feedback at one specific timing is quite a lot as it equals to number of users in multicast group.

The present disclosure proposes an improved solution for supporting more users in a PTM transmission.

According to a first aspect of the present disclosure, there is provided a method implemented at a terminal device in a PTM group. The method comprises receiving a message from a network node. The message indicates at least one of: delay information for a Hybrid Automatic Repeat reQuest (HARQ) feedback for a Point to Multipoint (PTM) transmission for the terminal device, a Physical Downlink Shared Channel (PDSCH) aggregation factor for the terminal device, and a HARQ feedback reporting mode for the PTM transmission for the terminal device. The method further comprises determining whether to transmit the HARQ feedback for the PTM transmission based on the message, and/or determining timing information for transmitting the HARQ feedback for the PTM transmission based on the message.

In accordance with an exemplary embodiment, the method according to the first aspect of the present disclosure may further comprise transmitting the HARQ feedback for the PTM transmission to the network node, based on the at least one of the delay information, the PDSCH aggregation factor and the HARQ feedback reporting mode.

In accordance with an exemplary embodiment, the HARQ feedback reporting mode for the PTM transmission for the terminal device comprises transmitting or skipping transmission of the HARQ feedback for the PTM transmission for the terminal device.

In accordance with an exemplary embodiment, the method according to the first aspect of the present disclosure may further comprise receiving the PTM transmission from the network node.

In accordance with an exemplary embodiment, the method according to the first aspect of the present disclosure may further comprise receiving an indication for transmitting the HARQ feedback for the PTM transmission.

In accordance with an exemplary embodiment, the indication comprises PDSCH to HARQ feedback delay conveyed in Physical Downlink Control Channel (PDCCH).

In accordance with an exemplary embodiment, transmitting the HARQ feedback for the PTM transmission further based on the indication.

In accordance with an exemplary embodiment, the delay information comprises an offset, and/or the PDSCH aggregation factor comprises an integer N.

In accordance with an exemplary embodiment, the timing information is determined by the PDSCH to HARQ feedback delay indicated in the indication plus the offset indicated in the message.

In accordance with an exemplary embodiment, receiving the PTM transmission may further comprise receiving N PDSCH aggregated transmissions without a transmission of a HARQ feedback.

In accordance with an exemplary embodiment, transmitting the HARQ feedback for the PTM transmission based on the PDSCH aggregation factor may further comprise transmitting the HARQ feedback after the reception of the N PDSCH aggregated transmissions.

In accordance with an exemplary embodiment, the HARQ feedback reporting mode and/or the PDSCH aggregation factor is determined according to radio link quality of the terminal device.

In accordance with an exemplary embodiment, the radio link quality of the terminal device is determined according to Channel Quality Indicator (CQI) report from layer 1 (L1) or feedback from a higher layer.

In accordance with an exemplary embodiment, the feedback from a higher layer comprises Radio link control (RLC) status report or Packet Data Convergence Protocol (PDCP) status report from layer 2 (L2).

In accordance with an exemplary embodiment, the PDSCH aggregation factor comprises an integer P corresponding to a first radio link quality and and/or an integer Q corresponding to a second radio link quality, wherein P is less than or equal to Q when the first radio link quality is better than the second radio link quality.

In accordance with an exemplary embodiment, the method according to the first aspect of the present disclosure may further comprise receiving the message from a network node again, when the radio link quality of the terminal device changes.

In accordance with an exemplary embodiment, the method according to the first aspect of the present disclosure may further comprise determining whether to transmit the HARQ feedback for the PTM transmission again, when the radio link quality of the terminal device changes.

In accordance with an exemplary embodiment, the delay information is for multiple terminal devices in a subset of the PTM group.

In accordance with an exemplary embodiment, the terminal devices in different subsets of the PTM group share a same Physical Uplink Control Channel (PUCCH) resource.

In accordance with an exemplary embodiment, the delay information comprises a maximum allowed time offset L for the terminal device.

In accordance with an exemplary embodiment, the timing information is determined based on the L and the identity, ID, of the terminal device.

According to a second aspect of the present disclosure, there is provided an apparatus implemented in a terminal device in a PTM group. The apparatus comprises one or more processors and one or more memories comprising computer program codes. The one or more memories and the computer program codes are configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus implemented in a terminal device in a PTM group. The apparatus comprises a receiving module and a determining module. In accordance with some exemplary embodiments, the receiving module is operable to carry out at least the receiving step of the method according to the first aspect of the present disclosure. The determining module is operable to carry out at least the determining step of the method according to the first aspect of the present disclosure.

According to a fifth aspect of the present disclosure, there is provided a method implemented at a network node. The method comprises determining a message indicating at least one of: delay information for a Hybrid Automatic Repeat reQuest (HARQ) feedback for a Point to Multipoint (PTM) transmission for at least one terminal device in a PTM group, a Physical Downlink Shared Channel (PDSCH) aggregation factor for the at least one terminal device, and a HARQ feedback reporting mode for the PTM transmission for the at least one terminal device. The method further comprises transmitting the message to the at least one terminal device.

In accordance with an exemplary embodiment, the method according to the fifth aspect of the present disclosure may further comprise receiving the HARQ feedback for the PTM transmission from the at least one terminal device, wherein the HARQ feedback is transmitted based on the message.

In accordance with an exemplary embodiment, the HARQ feedback reporting mode for the PTM transmission for the at least one terminal device comprises transmitting or skipping transmission of the HARQ feedback for the PTM transmission for the at least one terminal device.

In accordance with an exemplary embodiment, the method according to the fifth aspect of the present disclosure may further comprise transmitting the PTM transmission to the at least one terminal device.

In accordance with an exemplary embodiment, the method according to the fifth aspect of the present disclosure may further comprise transmitting an indication for the transmission of the HARQ feedback for the PTM transmission.

In accordance with an exemplary embodiment, the indication comprises PDSCH to HARQ feedback delay conveyed in Physical Downlink Control Channel, PDCCH.

In accordance with an exemplary embodiment, the HARQ feedback for the PTM transmission is transmitted further based on the indication.

In accordance with an exemplary embodiment, the delay information comprises an offset, and/or the PDSCH aggregation factor comprises an integer N.

In accordance with an exemplary embodiment, the HARQ feedback for the PTM transmission is received at a timing which is determined by the PDSCH to HARQ feedback delay indicated in the indication plus the offset indicated in the message.

In accordance with an exemplary embodiment, transmitting the PTM transmission comprises transmitting N PDSCH aggregated transmissions without a reception of a HARQ feedback.

In accordance with an exemplary embodiment, receiving the HARQ feedback for the PTM transmission comprises receiving the HARQ feedback after the transmission of the N PDSCH aggregated transmissions.

In accordance with an exemplary embodiment, the method according to the fifth aspect of the present disclosure may further comprise determining the HARQ feedback reporting mode and/or the PDSCH aggregation factor according to radio link quality of the at least one terminal device.

In accordance with an exemplary embodiment, the radio link quality of the terminal device is determined according to Channel Quality Indicator (CQI) report from layer 1 (L1) or feedback from a higher layer.

In accordance with an exemplary embodiment, the feedback from a higher layer comprises Radio link control (RLC) status report or Packet Data Convergence Protocol (PDCP) status report from layer 2 (L2).

In accordance with an exemplary embodiment, the PDSCH aggregation factor comprises an integer P corresponding to a first radio link quality and and/or an integer Q corresponding to a second radio link quality, wherein P is less than or equal to Q when the first radio link quality is better than the second radio link quality.

In accordance with an exemplary embodiment, the method according to the fifth aspect of the present disclosure may further comprise transmitting the message to the at least one terminal device again, when the radio link quality of the at least one terminal device changes.

In accordance with an exemplary embodiment, the method according to the fifth aspect of the present disclosure may further comprise determining the HARQ feedback reporting mode and/or the PDSCH aggregation factor again, when the radio link quality of the at least one terminal device changes.

In accordance with an exemplary embodiment, the delay information is for multiple terminal devices in a subset of the PTM group.

In accordance with an exemplary embodiment, the method according to the fifth aspect of the present disclosure may further comprise dividing the at least one terminal device in the PTM group into at least one subset.

In accordance with an exemplary embodiment, the delay information for different subsets of the PTM group are different.

In accordance with an exemplary embodiment, the terminal devices in different subsets of the PTM group share a same Physical Uplink Control Channel (PUCCH) resource.

In accordance with an exemplary embodiment, the delay information comprises a maximum allowed time offset L for the terminal device.

In accordance with an exemplary embodiment, the step of dividing is based on a number of the values of the delay information for the at least one terminal device in the PTM group.

In accordance with an exemplary embodiment, the number of values of the delay information for the at least one terminal device in the PTM group is predetermined, or based on a rule using an identifier of the at least one terminal device and the maximum allowed time offset L.

In accordance with an exemplary embodiment, the HARQ feedback for the PTM transmission is received at a timing which is determined by an identifier of the at least one terminal device and the maximum allowed time offset L.

In accordance with an exemplary embodiment, the method according to the fifth aspect of the present disclosure may further comprise configuring the PUCCH resource based on a maximum number of terminal devices per subset of the PTM group.

According to a sixth aspect of the present disclosure, there is provided an apparatus implemented in a network node. The apparatus comprises one or more processors and one or more memories comprising computer program codes. The one or more memories and the computer program codes are configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus implemented in a network node. The apparatus comprises a determining module and a transmitting module. In accordance with some exemplary embodiments, the determining module is operable to carry out at least the determining step of the method according to the fifth aspect of the present disclosure. The transmitting module is operable to carry out at least the transmitting step of the method according to the fifth aspect of the present disclosure.

According to a ninth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the method according to the fifth aspect of the present disclosure.

According to a tenth aspect of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the method according to the fifth aspect of the present disclosure.

According to an eleventh aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to the first aspect of the present disclosure.

According to a twelfth aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the first aspect of the present disclosure.

According to a thirteenth aspect of the present disclosure, there is provided a method implemented in a communication system which may include a host computer, a base station and a UE. The method may comprise, at the host computer, receiving user data transmitted to the base station from the UE which may perform any step of the method according to the first aspect of the present disclosure.

According to a fourteenth aspect of the present disclosure, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to the first aspect of the present disclosure.

According to a fifteenth aspect of the present disclosure, there is provided a method implemented in a communication system which may include a host computer, a base station and a UE. The method may comprise, at the host computer, receiving, from the base station, user data originating from a transmission which the base station has received from the UE. The base station may perform any step of the method according to the fifth aspect of the present disclosure.

According to a sixteenth aspect of the present disclosure, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to the fifth aspect of the present disclosure.

With above aspects of the present disclosure, since a smaller total number of PUCCH resource is required for PTM HARQ feedback, more users can be in a PTM group (multicast group) given the same number of PUCCH resource. In addition, more UEs can transmit HARQ feedback thanks to the varying time delay.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
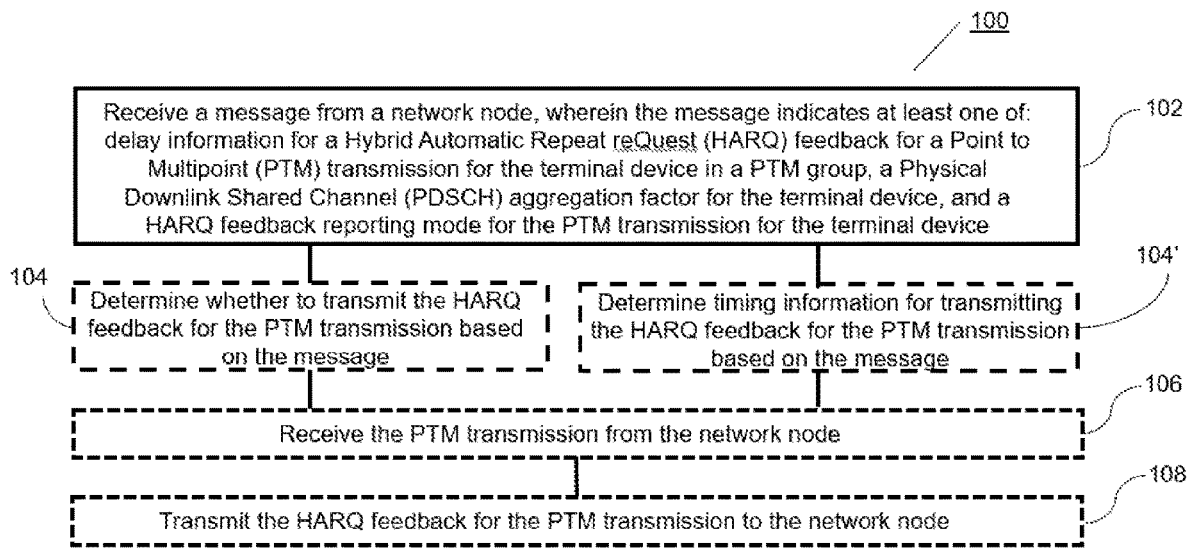
FIG. 1 is a flowchart illustrating a method according to some embodiments of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G, 6G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like. In the following description, terms "terminal device" and "UE" will be used interchangeably. Terms "PTM group" and "multicast group", "PTM transmission" and "multicast transmission" will be used interchangeably.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As illustrated above, for the issue of required PUCCH resources for HARQ feedback at one specific timing being quite a lot as it may equal to number of users in PTM (multicast) group, two methods are proposed for the PTM transmission, which could be implemented individually or together.

The first one is to spread the HARQ feedback of the multiple UEs in time by configuring UEs in a PTM (multicast) group with an extra delay to send HARQ feedback when it receives PTM transmission. At least more than one extra delay can be configured so that users in PTM group will send HARQ feedback in different time. Since users which transmit HARQ feedback in different extra delay can share the same PUCCH resource, then the required PUCCH resource per slot is reduced.

The second one is to configure UE in multicast group with different PDSCH aggregation factors. UE with good radio link is configured with less number of aggregation. UE with worse radio link quality is configured with more number of aggregation. UE will send HARQ feedback only after receiving all aggregated PDSCH.

With the two methods, at the same UL slots, the number of UEs that need to send HARQ feedback will be reduced, and correspondingly the number of required PUCCH resource for PTM HARQ feedback in a slot will be reduced thanks to the varying additional delays.

In addition, the using of PDSCH aggregation, with or without different aggregation factors, is extended to normal HARQ transmission. Further, a possibility to configure selected UEs not to send HARQ is introduced.

FIG. 1 is a flowchart illustrating a method 100 according to some embodiments of the present disclosure. The method 100 illustrated in FIG. 1 may be performed by an apparatus implemented in a terminal device or communicatively coupled to a terminal device.

According to the exemplary method 100 illustrated in FIG. 1, the terminal device such as a UE can receive a message from a network node, as shown in block 102. In accordance with an exemplary embodiment, the message indicates at least one of: delay information for a Hybrid Automatic Repeat reQuest (HARQ) feedback for a Point to Multipoint (PTM) transmission for the terminal device, a Physical Downlink Shared Channel (PDSCH) aggregation factor for the terminal device, and a HARQ feedback reporting mode for the PTM transmission for the terminal device.

According to the exemplary method 100 illustrated in FIG. 1, the terminal device such as a UE can determine whether to transmit the HARQ feedback for the PTM transmission based on the message, as shown in block 104, and/or determine timing information for transmitting the HARQ feedback for the PTM transmission based on the message, as shown in block 104'.

The determination of whether to transmit the HARQ feedback for the PTM transmission might be optional. In an example, when the UE determines to transmit the HARQ feedback for the PTM transmission, it may further determine the timing information for transmitting the HARQ feedback for the PTM transmission based on the information received from the network node. When the UE determines not to transmit the HARQ feedback for the PTM transmission, it may not need to further determine the timing information for transmitting the HARQ feedback for the PTM transmission. In another example, the UE may not determine whether to transmit the HARQ feedback for the PTM transmission, it only determines the timing information for transmitting the HARQ feedback for the PTM transmission based on the information received from the network node.

According to the exemplary method 100, the terminal device such as a UE can further transmit the HARQ feedback for the PTM transmission to the network node, based on the at least one of the delay information, the PDSCH aggregation factor and the HARQ feedback reporting mode, as shown in block 108.

According to the exemplary method 100, the terminal device such as a UE can further receive the PTM transmission from the network node, as shown in block 106.

It should be understood that the step of receiving the PTM transmission as shown in block 106 could be performed before or after the step of receiving the message as shown in block 102, which means the configuration of whether or how to transmit the HARQ feedback could be received before or after the PTM transmission is received.

In accordance with an exemplary embodiment, the HARQ feedback reporting mode for the PTM transmission for the terminal device comprises transmitting or skipping transmission of the HARQ feedback for the PTM transmission for the terminal device. In accordance with an exemplary embodiment, the HARQ feedback reporting mode may be determined according to radio link quality of the terminal device. Furthermore, the radio link quality of the terminal device may be determined according to Channel Quality Indicator (CQI) report from layer 1 (L1, the physical layer), or feedback from a higher layer (e.g. L2, L3, L4, etc.). The feedback from a higher layer may comprise Radio link control (RLC) status report or Packet Data Convergence Protocol (PDCP) status report from layer 2 (L2, e.g. MAC, RLC, PDCP layer).

As an example, since UEs in PTM (multicast) group experience different radio link quality, and network usually will send PDSCH according to the UE with the worst radio link quality, it is almost quite sure that UE with good radio link quality will receive PDSCH, therefore it is not necessary that they send HARQ feedback. Then the network could configure some UEs with very good radio link quality not to send HARQ feedback at all. For other UEs with normal or bad link quality, they may need to send HARQ feedback according to the embodiments described above and as follows.

According to the exemplary method 100, the terminal device such as a UE can further receive an indication for transmitting the HARQ feedback for the PTM transmission. In accordance with an exemplary embodiment, the indication may comprise PDSCH to HARQ feedback delay conveyed in Physical Downlink Control Channel (PDCCH). In this case, transmitting the HARQ feedback for the PTM transmission further based on the indication. In accordance with an exemplary embodiment, the delay information may comprise an offset. In an example, the timing information is determined by the PDSCH to HARQ feedback delay indicated in the indication plus the offset indicated in the message.

As an example, when a UE receives a multicast PDCCH, it will check this HARQ feedback timing offset, if it is 0, then UE will send HARQ feedback as it is specified in DCI in PDCCH. If it is 1, then UE will send HARQ feedback at the slot as specified in DCI in PDCCH plus 1 slot. If it is 2, then UE will send HARQ feedback at the slot as specified in DCI in PDCCH plus 2 slots.

In accordance with an exemplary embodiment, the PDSCH aggregation factor may comprise an integer N. In this case, receiving the PTM transmission may comprise receiving N PDSCH aggregated transmissions without a transmission of a HARQ feedback. Furthermore, transmitting the HARQ feedback for the PTM transmission based on the PDSCH aggregation factor may comprise transmitting the HARQ feedback after the reception of the N PDSCH aggregated transmissions.

In an example, via one scheduling instance, network will send N PDSCH with different redundancy version, where the N can be 1, 2, 4, 8. UE is required to send HARQ feedback only after it has received all of the PDSCH aggregated transmissions. Taking advantage of this feature, network can configure UEs in a multicast group with good radio link quality with less number of (nrof) transmissions in a PDSCH aggregation, UE in a multicast group with bad radio link quality more nrof transmissions in a PDSCH aggregation, then UE with good radio link quality will send HARQ feedback earlier compared to UE with bad radio link quality in a multicast group. Then the required PUCCH resource at one UL slot is reduced. In some scenarios, the radio link quality of each UE in multicast group could change, then network can reconfigure the PDSCH aggregation factors for the UE in multicast group when it has noticed that the radio link quality has changed a lot.

In these embodiments, PDSCH repetition via aggregated transmission could be used individually or combined with the extra offset transmission solution described above to achieve similar effect. As another example, the network can configure the extra delay mentioned above together with PDSCH aggregation. Either all UE in multicast group may use the same PDSCH aggregation factor, or different UEs in multicast group use different PDSCH aggregation factors.

In accordance with an exemplary embodiment, the PDSCH aggregation factor may be determined according to radio link quality of the terminal device. Furthermore, the radio link quality of the terminal device may be determined according to Channel Quality Indicator (CQI) report from layer 1 (L1, the physical layer), or feedback from a higher layer (e.g. L2, L3, L4, etc.). The feedback from a higher layer may comprise Radio link control (RLC) status report or Packet Data Convergence Protocol (PDCP) status report from layer 2 (L2, e.g. MAC, RLC, PDCP layer).

In accordance with an exemplary embodiment, the PDSCH aggregation factor may comprises an integer P corresponding to a first radio link quality and and/or an integer Q corresponding to a second radio link quality, wherein P is less than or equal to Q when the first radio link quality is better than the second radio link quality.

As yet another example, PDSCH aggregation can be combined with normal HARQ (re)transmission. That is, for each scheduling occasion, N aggregated PDSCH can be transmitted. After receiving the HARQ feedback, if it is NACK, another N aggregated PDSCH can be (re)transmitted again. UEs may be configured with different aggregation factors, meaning that the HARQ feedback would be provided at different times, which would spread the HARQ feedback in time in the same way as for PDSCH repetitions. UEs in good channel conditions can be configured with a lower aggregation factor, so they will report earlier than UEs with worse radio reception conditions.

According to the exemplary method 100, the terminal device such as a UE can further receive the message from a network node again, when the radio link quality of the terminal device changes.

According to the exemplary method 100, the terminal device such as a UE can further determine whether to transmit the HARQ feedback for the PTM transmission again, when the radio link quality of the terminal device changes.

As an example, as described above, it may be not necessary for the UE with good radio link quality to send HARQ feedback. But the radio link quality for the UE might change, due to the UE mobility or radio link conditions change, etc. When such UEs, with initially very good radio link quality, move to worse radio conditions and start receiving erroneous data, they may inform the network via a higher layer message, such as e.g. an RLC negative-acknowledgement (NACK), that the data has not been correctly received. The network may then turn them into a HARQ feedback reporting mode of operation. Similarly, UEs with initially bad radio link quality, sending regular HARQ feedback, may inform the network via a higher layer message that the reception quality has improved, so that HARQ reporting is no longer needed. The network may then reconfigure the UE to stop sending HARQ.

In accordance with an exemplary embodiment, the delay information is for multiple terminal devices in a subset of the PTM group.

In accordance with an exemplary embodiment, the terminal devices in different subsets of the PTM group share a same Physical Uplink Control Channel (PUCCH) resource. For example, a first UE to transmit HARQ feedback in the first slot, a second UE to transmit HARQ feedback in the second slot, a third UE to transmit HARQ feedback in the third slot, etc. could share a same PUCCH resource.

In accordance with an exemplary embodiment, the delay information may comprise a maximum allowed time offset L for the terminal device. In this case, the timing information may be determined based on the L and the identity (ID) of the terminal device, e.g. UE_ID mod L.

As an example, network will configure users in multicast group with a different HARQ feedback timing offset via RRC signaling and users with different HARQ feedback timing offset share the same PUCCH resource. Assuming there are 3 different values for HARQ feedback timing offset, 0, 1 and 2, gNB can divide all N users in a multicast group into 3 sub-groups with around equal number of users N/3 and then configure each user in sub-group with different values. Then the number of PUCCH resource need be configured for N user in PTM group is just N/3 instead of N. This is because users in different subgroup can then share the PUCCH resource as they do not need to transmit PUCCH in same slot.

As another example, besides to configure each UE a concrete time offset to divide UE into different slots, another method to divide UE into different slots. That is, network configures all UE a single common value 'L' which is the maximum allowed time offset. Then there is a rule known at both gNB and UE about how to divide UE into different sub-group, i.e. using different time offset. This rule could be UE_ID mod L. Then the PUCCH resource to configure is according to the maximum number of (nrof) users per slot.

In this way, users in a multicast group but in different sub-group will send HARQ feedback at different UL slot, then the required number of PUCCH at one specific timing is reduced.

Figure 2:
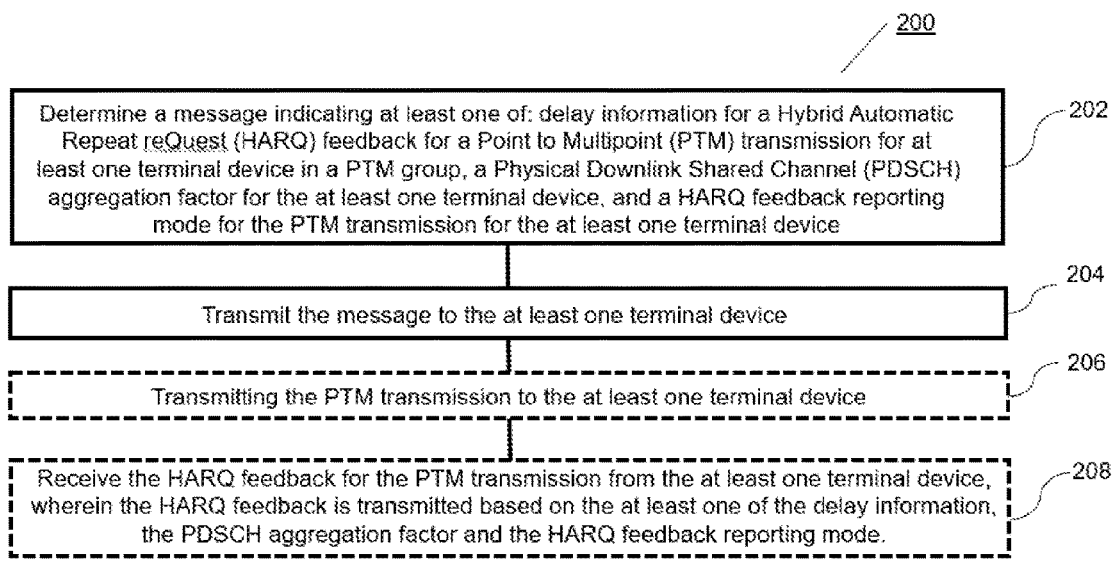
FIG. 2 is a flowchart illustrating another method according to some embodiments of the present disclosure.

FIG. 2 is a flowchart illustrating a method 200 according to some embodiments of the present disclosure. As described in connection with FIG. 1, the method 200 illustrated in FIG. 2 may be performed by an apparatus implemented in a network node or communicatively coupled to a network node. In accordance with an exemplary embodiment, the network node such as a gNB may determine a message indicating at least one of: delay information for a Hybrid Automatic Repeat reQuest (HARQ) feedback for a Point to Multipoint (PTM) transmission for at least one terminal device in a PTM group, a Physical Downlink Shared Channel (PDSCH) aggregation factor for the at least one terminal device, and a HARQ feedback reporting mode for the PTM transmission for the at least one terminal device, as shown in block 202.

According to the exemplary method 200, the network node such as a gNB can further transmit the message to the at least one terminal device, as shown in block 204.

According to the exemplary method 200, the network node such as a gNB can further receive the HARQ feedback for the PTM transmission from the at least one terminal device, as shown in block 208. The HARQ feedback is transmitted based on the message.

According to the exemplary method 200, the network node such as a gNB can further transmit the PTM transmission to the at least one terminal device, as shown in block 206.

It should be understood that the step of transmitting the PTM transmission as shown in block 206 could be performed before or after the step of determining or transmitting the message as shown in block 202 or 204, which means the configuration of whether or how to transmit the HARQ feedback could be transmitted before or after the transmitting the PTM transmission.

In accordance with an exemplary embodiment, the HARQ feedback reporting mode for the PTM transmission for the terminal device comprises transmitting or skipping transmission of the HARQ feedback for the PTM transmission for the terminal device. In accordance with an exemplary embodiment, the HARQ feedback reporting mode may be determined according to radio link quality of the terminal device. Furthermore, the radio link quality of the terminal device may be determined according to Channel Quality Indicator (CQI) report from layer 1 (L1, the physical layer), or feedback from a higher layer (e.g. L2, L3, L4, etc.). The feedback from a higher layer may comprise Radio link control (RLC) status report or Packet Data Convergence Protocol (PDCP) status report from layer 2 (L2, e.g. MAC, RLC, PDCP layer).

As an example, since UEs in PTM (multicast) group experience different radio link quality, and network usually will send PDSCH according to the UE with the worst radio link quality, it is almost quite sure that UE with good radio link quality will receive PDSCH, therefore it is not necessary that they send HARQ feedback. Then the network could configure some UEs with very good radio link quality not to send HARQ feedback at all. For other UEs with normal or bad link quality, they may need to send HARQ feedback according to the embodiments described above and as follows.

According to the exemplary method 200, the network node such as a gNB can further transmitting an indication for the transmission of the HARQ feedback for the PTM transmission. In accordance with an exemplary embodiment, the indication may comprise PDSCH to HARQ feedback delay conveyed in Physical Downlink Control Channel (PDCCH). In this case, the HARQ feedback for the PTM transmission is transmitted further based on the indication. In accordance with an exemplary embodiment, the delay information may comprise an offset. In an example, the HARQ feedback for the PTM transmission is received at a timing which is determined by the PDSCH to HARQ feedback delay indicated in the indication plus the offset indicated in the message.

As an example, when a UE receives a multicast PDCCH, it will check this HARQ feedback timing offset, if it is 0, then UE will send HARQ feedback as it is specified in DCI in PDCCH. If it is 1, then UE will send HARQ feedback at the slot as specified in DCI in PDCCH plus 1 slot. If it is 2, then UE will send HARQ feedback at the slot as specified in DCI in PDCCH plus 2 slots.

In accordance with an exemplary embodiment, the PDSCH aggregation factor may comprise an integer N. In this case, transmitting the PTM transmission may comprise transmitting N PDSCH aggregated transmissions without a reception of a HARQ feedback. Furthermore, receiving the HARQ feedback for the PTM transmission based on the PDSCH aggregation factor may comprise receiving the HARQ feedback after the transmission of the N PDSCH aggregated transmissions.

In an example, via one scheduling instance, network will send N PDSCH with different redundancy version, where N can be 1, 2, 4, 8. UE is required to send HARQ feedback only after it has received all of the PDSCH aggregated transmissions. Taking advantage of this feature, network can configure UEs in a multicast group with good radio link quality with less number of (nrof) transmissions in a PDSCH aggregation, UE in a multicast group with bad radio link quality more nrof transmissions in a PDSCH aggregation, then UE with good radio link quality will send HARQ feedback earlier compared to UE with bad radio link quality in a multicast group. Then the required PUCCH resource at one UL slot is reduced. In some scenarios, the radio link quality of each UE in multicast group could change, network can reconfigure the PDSCH aggregation factors for the UE in multicast group when it has noticed that the radio link quality has changed a lot.

In these embodiments, PDSCH repetition via aggregated transmission could be used individually or combined with the offset solution described above to achieve similar effect. As another example, the network can configure the extra delay mentioned above together with PDSCH aggregation. Either all UE in multicast group may use the same PDSCH aggregation factor, or different UEs in multicast group use different PDSCH aggregation factors.

In accordance with an exemplary embodiment, the PDSCH aggregation factor may be determined according to radio link quality of the terminal device. Furthermore, the radio link quality of the terminal device may be determined according to Channel Quality Indicator (CQI) report from layer 1 (L1, the physical layer), or feedback from a higher layer (e.g. L2, L3, L4, etc.). The feedback from a higher layer may comprise Radio link control (RLC) status report or Packet Data Convergence Protocol (PDCP) status report from layer 2 (L2, e.g. MAC, RLC, PDCP layer).

In accordance with an exemplary embodiment, the PDSCH aggregation factor may comprises an integer P corresponding to a first radio link quality and and/or an integer Q corresponding to a second radio link quality, wherein P is less than or equal to Q when the first radio link quality is better than the second radio link quality.

As yet another example, PDSCH aggregation can be combined with normal HARQ (re)transmission. That is, for each scheduling occasion, N aggregated PDSCH can be transmitted. After receiving the HARQ feedback, if it is NACK, another N aggregated PDSCH can be (re)transmitted again. UEs may be configured with different aggregation factors, meaning that the HARQ feedback would be provided at different times, which would spread the HARQ feedback in time in the same way as for PDSCH repetitions. UEs in good channel conditions can be configured with a lower aggregation factor, so they will report earlier than UEs with worse radio reception conditions.

According to the exemplary method 200, the network node such as a gNB can further transmit the message to the at least one terminal device again, when the radio link quality of the at least one terminal device changes.

According to the exemplary method 200, the network node such as a gNB can further determine the HARQ feedback reporting mode and/or the PDSCH aggregation factor again, when the radio link quality of the at least one terminal device changes.

As an example, as described above, it may be not necessary for the UE with good radio link quality to send HARQ feedback. But the radio link quality for the UE might change, due to the UE mobility or radio link conditions change, etc. When such UEs, with initially very good radio link quality, move to worse radio conditions and start receiving erroneous data, they may inform the network via a higher layer message, such as e.g. an RLC negative-acknowledgement (NACK), that the data has not been correctly received. The network may then turn them into a HARQ feedback reporting mode of operation. Similarly, UEs with initially bad radio link quality, sending regular HARQ feedback, may inform the network via a higher layer message that the reception quality has improved, so that HARQ reporting is no longer needed. The network may then reconfigure the UE to stop sending HARQ.

In accordance with an exemplary embodiment, the delay information is for multiple terminal devices in a subset of the PTM group.

In accordance with an exemplary embodiment, the delay information for different subsets of the PTM group are different.

In accordance with an exemplary embodiment, the terminal devices in different subsets of the PTM group share a same Physical Uplink Control Channel (PUCCH) resource. For example, a first UE to transmit HARQ feedback in the first slot, a second UE to transmit HARQ feedback in the second slot, a third UE to transmit HARQ feedback in the third slot, etc. could share a same PUCCH resource.

In accordance with an exemplary embodiment, the delay information may comprise a maximum allowed time offset L for the terminal device. In this case, the HARQ feedback for the PTM transmission is received at a timing which is determined by an identifier of the at least one terminal device and the maximum allowed time offset L, e.g. UE_ID mod L.

According to the exemplary method 200, the network node such as a gNB can further divide the at least one terminal device in the PTM group into at least one subset.

In accordance with an exemplary embodiment, the step of dividing is based on a number of the values of the delay information for the at least one terminal device in the PTM group. In accordance with an exemplary embodiment, the number of values of the delay information for the at least one terminal device in the PTM group is predetermined, or based on a rule using an identifier of the at least one terminal device and the maximum allowed time offset L, e.g. UE_ID mod L.

As an example, network will configure users in multicast group with a different HARQ feedback timing offset via RRC signaling and users with different HARQ feedback timing offset share the same PUCCH resource. Assuming there are 3 different values for HARQ feedback timing offset, 0, 1 and 2, gNB can divide all N users in a multicast group into 3 sub-groups with around equal number of users N/3 and then configure each user in sub-group with different values. Then the number of PUCCH resource need be configured for N user in PTM group is just N/3 instead of N. This is because users in different subgroup can then share the PUCCH resource as they do not need to transmit PUCCH in same slot.

As another example, besides to configure each UE a concrete time offset to divide UE into different slots, another method to divide UE into different slots. That is, network configures all UE a single common value 'L' which is the maximum allowed time offset. Then there is a rule known at both gNB and UE about how to divide UE into different sub-group, i.e. using different time offset. This rule could be UE_ID mod L. Then the PUCCH resource to configure is according to the maximum nrof users per slot.

According to the exemplary method 200, the network node such as a gNB can further configuring the PUCCH resource based on a maximum number of terminal devices per subset of the PTM group.

It will be realized that parameters, variables and settings related to the determination, transmission and reception described herein are just examples. Other suitable network settings, the associated configuration parameters and the specific values thereof may also be applicable to implement the proposed methods.

The proposed solution according to one or more exemplary embodiments can support more users in a PTM (multicast) group given the same number of PUCCH resource, since a smaller total number of PUCCH resource is required for PTM HARQ feedback. In addition, more UEs can transmit HARQ feedback thanks to the varying time delay.

The various blocks shown in FIG. 1 and FIG. 2 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 3:
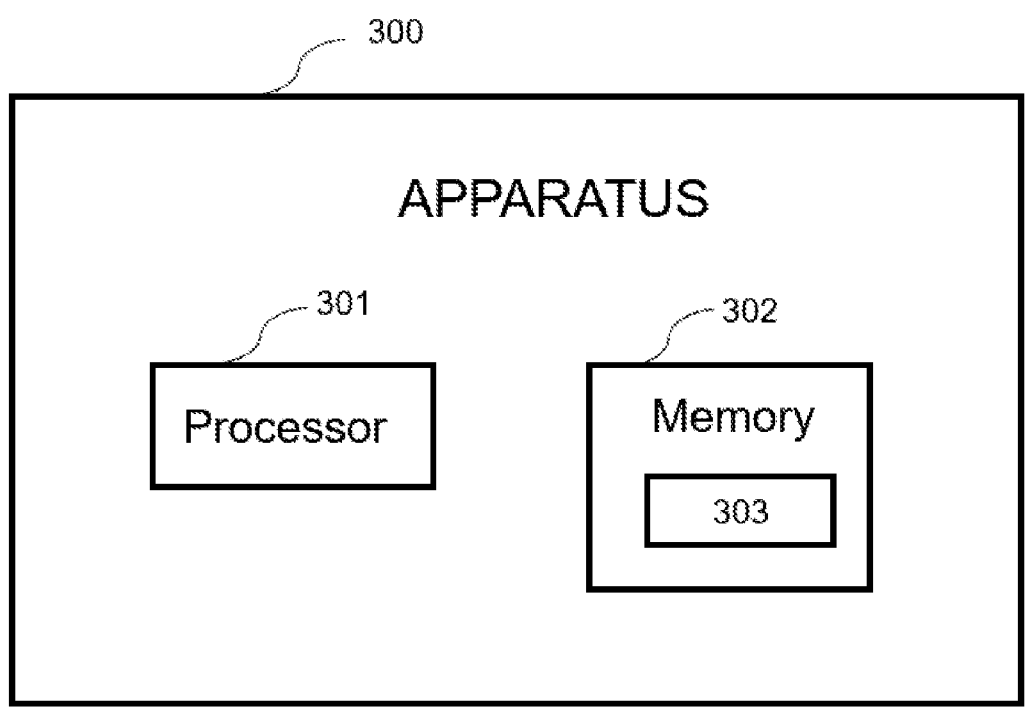
FIG. 3 is a block diagram illustrating an apparatus according to some embodiments of the present disclosure.
Figure 4:
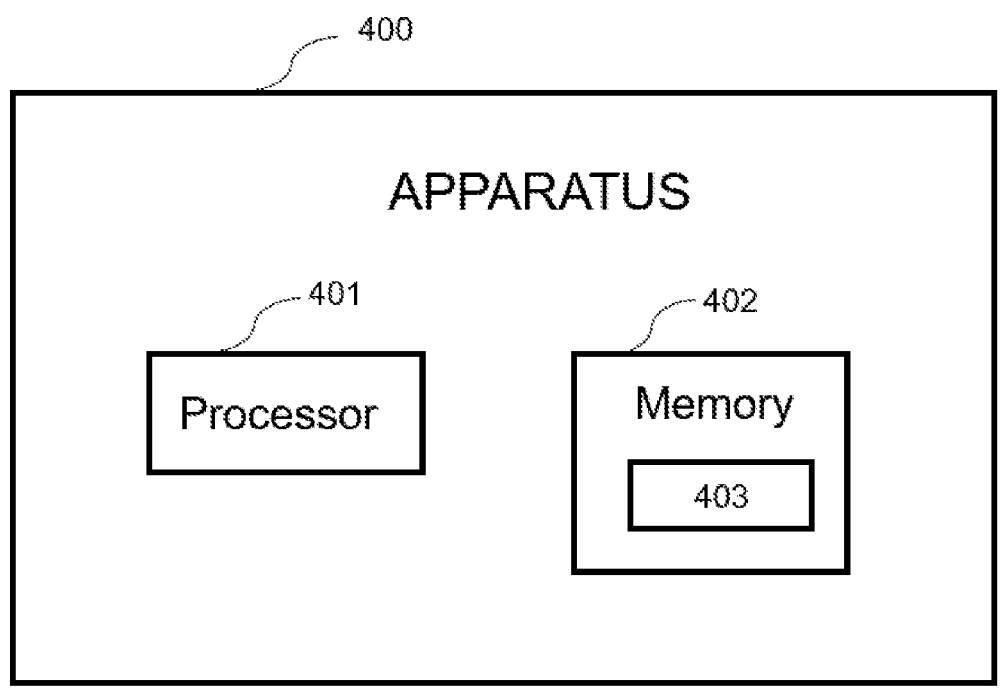
FIG. 4 is a block diagram illustrating another apparatus according to some embodiments of the present disclosure.

FIG. 3 and FIG. 4 are block diagrams illustrating an apparatus 300 and 400 according to various embodiments of the present disclosure. As shown in FIG. 3 and FIG. 4, the apparatus 300 and 400 may comprise one or more processors such as processor 301 and 401, and one or more memories such as memory 302 and 402, storing computer program codes 303 and 403. The memory 302 and 402 may be non-transitory machine/processor/computer readable storage medium. In accordance with some exemplary embodiments, the apparatus 300 and 400 may be implemented as an integrated circuit chip or module that can be plugged or installed into a terminal device as described with respect to FIG. 1, and a network node as described with respect to FIG. 2.

In some implementations, the one or more memories 302 and 402, and the computer program codes 303 and 403, may be configured to, with the one or more processors 301 and 401, cause the apparatus 300 and 400 at least to perform any operation of the method as described in connection with FIG. 1 and FIG. 2. In other implementations, the one or more memories 302 and 402, and the computer program codes 303 and 403, may be configured to, with the one or more processors 301 and 401, cause the apparatus 300 and 400 at least to perform any operation of the method as described in connection with FIG. 1 and FIG. 2.

Figure 5:
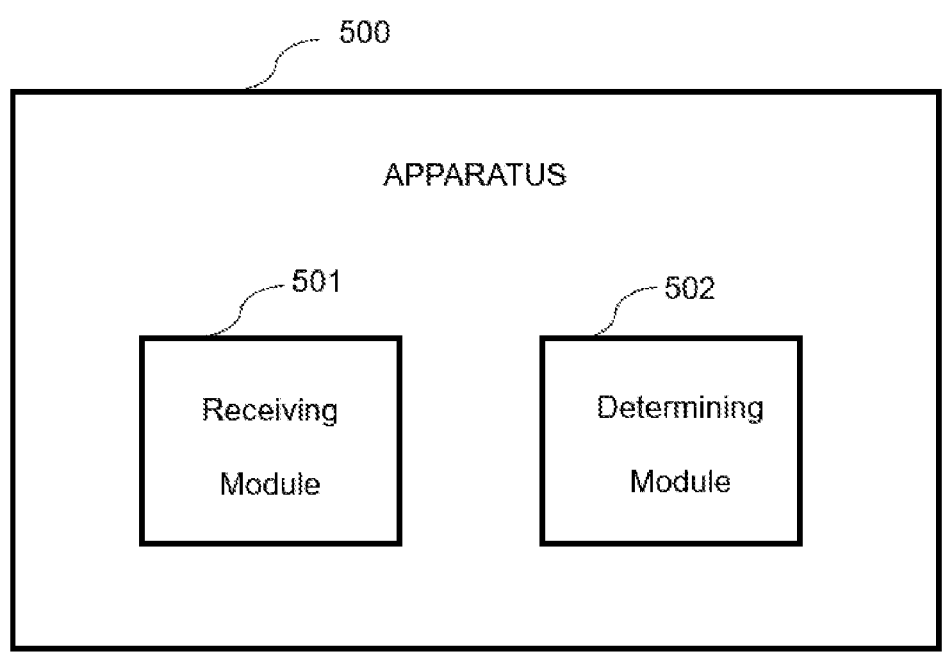
FIG. 5 is a block diagram illustrating yet another apparatus according to some embodiments of the present disclosure.

FIG. 5 is a block diagram illustrating an apparatus 500 according to some embodiments of the present disclosure. As shown in FIG. 5, the apparatus 500 may comprise a receiving module 501 and a determining module 502. In an exemplary embodiment, the apparatus 500 may be implemented in a terminal device such as a UE. The receiving module 501 may be operable to carry out the operation in block 102, and the determining module 502 may be operable to carry out the operation in block 104 and/or 104'. Optionally, the receiving module 501 and/or the determining module 502 may be operable to carry out more or less operations to implement the proposed methods according to the exemplary embodiments of the present disclosure.

Figure 6:
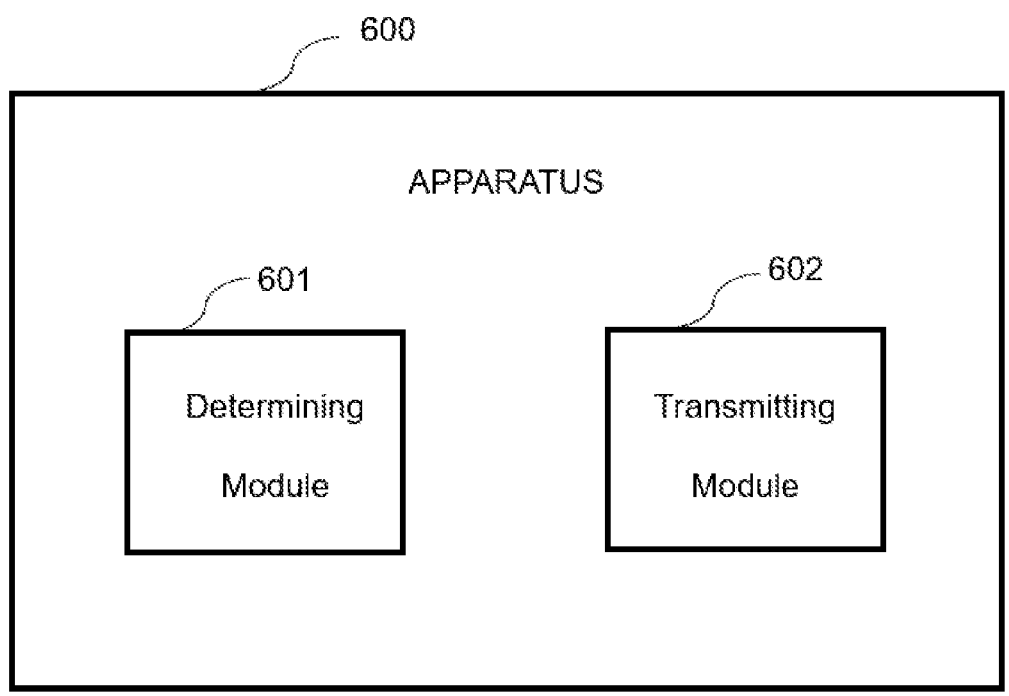
FIG. 6 is a block diagram illustrating yet another apparatus according to some embodiments of the present disclosure.

FIG. 6 is a block diagram illustrating an apparatus 600 according to some embodiments of the present disclosure. As shown in FIG. 6, the apparatus 600 may comprise a determining module 601 and a transmitting module 602. In an exemplary embodiment, the apparatus 600 may be implemented in a network node such as a gNB. The determining module 601 may be operable to carry out the operation in block 202. The transmitting module 602 may be operable to carry out the operation in block 204. Optionally, the determining module 601 and/or the transmitting module 602 may be operable to carry out more or less operations to implement the proposed methods according to the exemplary embodiments of the present disclosure.

Figure 7:
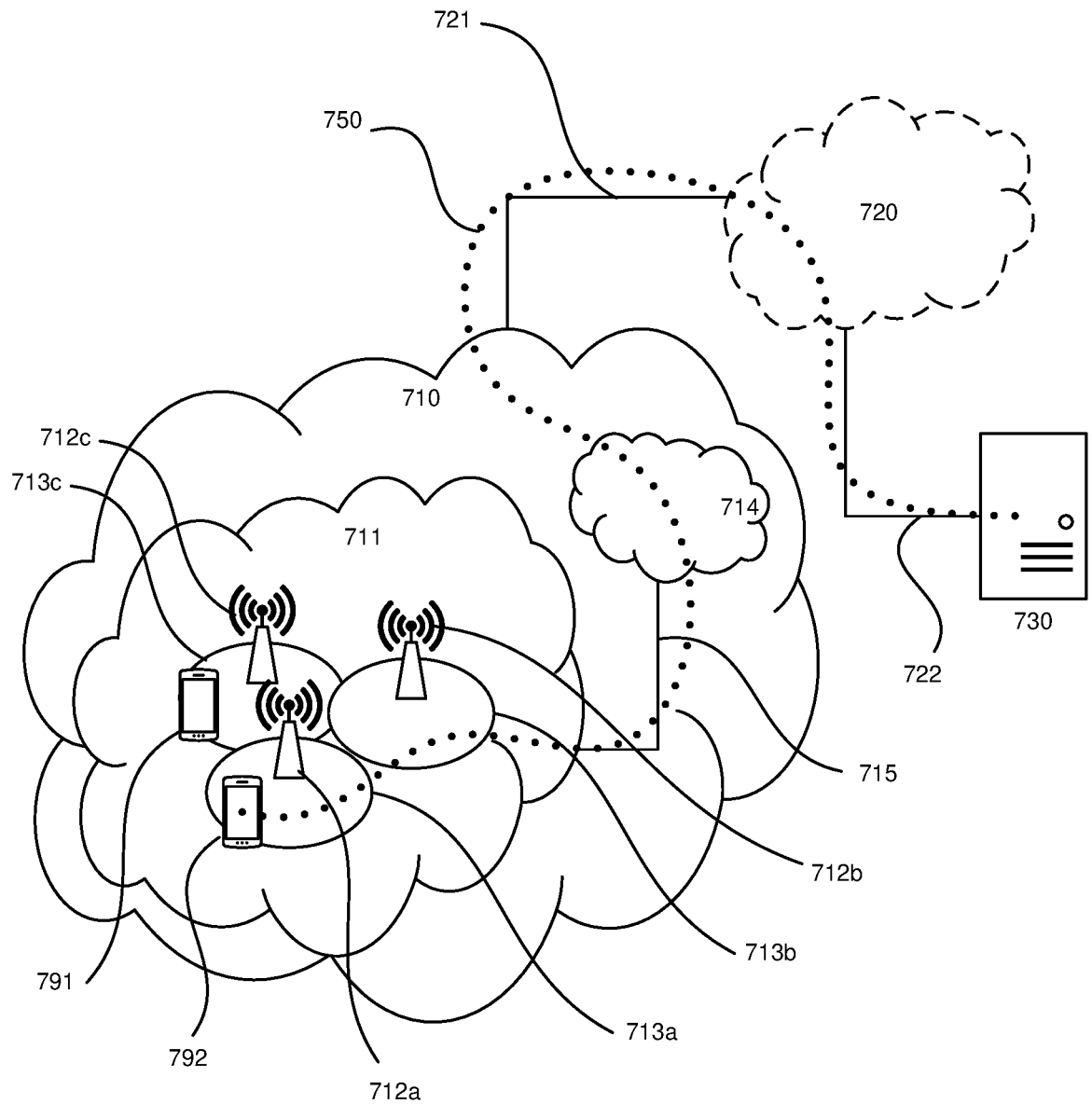
FIG. 7 is a block diagram illustrating a telecommunication network connected via an intermediate network to a host computer in accordance with some embodiments of the present disclosure.

FIG. 7 is a block diagram illustrating a telecommunication network connected via an intermediate network to a host computer in accordance with some embodiments of the present disclosure.

With reference to FIG. 7, in accordance with an embodiment, a communication system includes a telecommunication network 710, such as a 3GPP-type cellular network, which comprises an access network 711, such as a radio access network, and a core network 714. The access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to the core network 714 over a wired or wireless connection 715. A first UE 791 located in a coverage area 713c is configured to wirelessly connect to, or be paged by, the corresponding base station 712c. A second UE 792 in a coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. Connections 721 and 722 between the telecommunication network 710 and the host computer 730 may extend directly from the core network 714 to the host computer 730 or may go via an optional intermediate network 720. An intermediate network 720 may be one of, or a combination of more than one of, a public, private or hosted network; the intermediate network 720, if any, may be a backbone network or the Internet; in particular, the intermediate network 720 may comprise two or more subnetworks (not shown).

The communication system of FIG. 7 as a whole enables connectivity between the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, the base station 712 may not or need not be informed about the past routing of an incoming downlink communication with data originating from the host computer 730 to be forwarded (e.g., handed over) to a connected UE 791. Similarly, the base station 712 need not be aware of the future routing of an outgoing uplink communication originating from the UE 791 towards the host computer 730.

Figure 8:
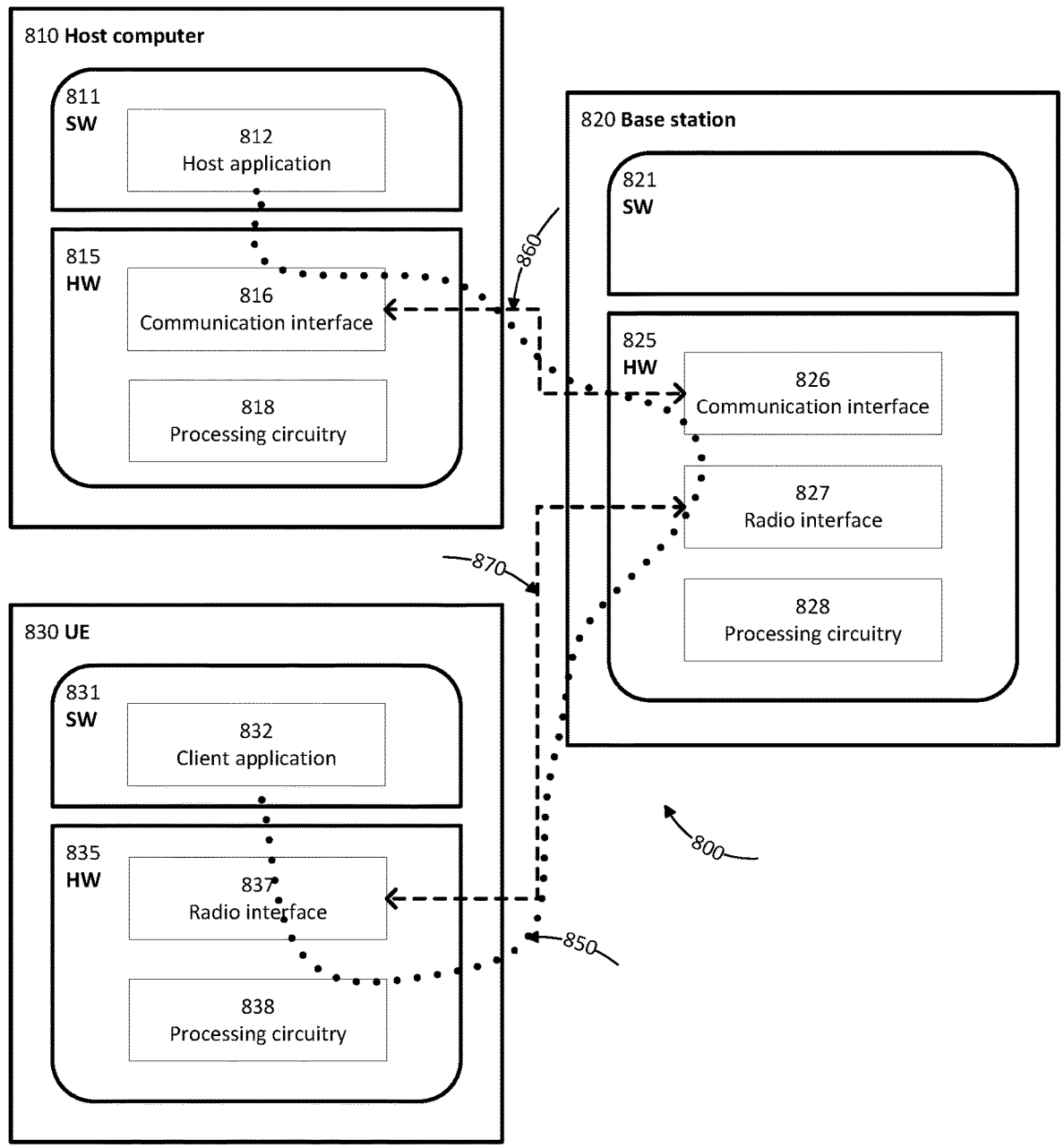
FIG. 8 is a block diagram illustrating a host computer communicating via a base station with a UE over a partially wireless connection in accordance with some embodiments of the present disclosure.

FIG. 8 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises a processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with the UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes a processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes a processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

It is noted that the host computer 810, the base station 820 and the UE 830 illustrated in FIG. 8 may be similar or identical to the host computer 730, one of base stations 712a, 712b, 712c and one of UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the UE 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

Wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 850 between the host computer 810 and the UE 830, in response to variations in the measurement results. The measurement procedure and/or the network functionality for reconfiguring the OTT connection 850 may be implemented in software 811 and hardware 815 of the host computer 810 or in software 831 and hardware 835 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which the software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer 810's measurements of throughput, propagation times, latency and the like. The measurements may be implemented in that the software 811 and 831 causes messages to be transmitted, in particular empty or 'dummy' messages, using the OTT connection 850 while it monitors propagation times, errors etc.

Figure 9:
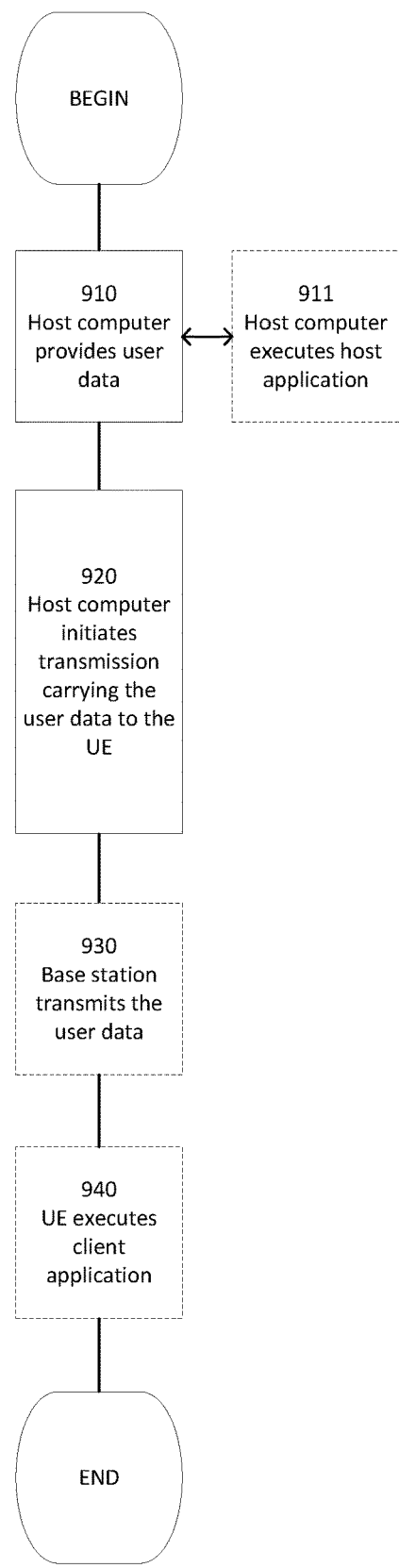
FIG. 9 is a flowchart illustrating a method implemented in a communication system, in accordance with an embodiment of the present disclosure.

FIG. 9 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
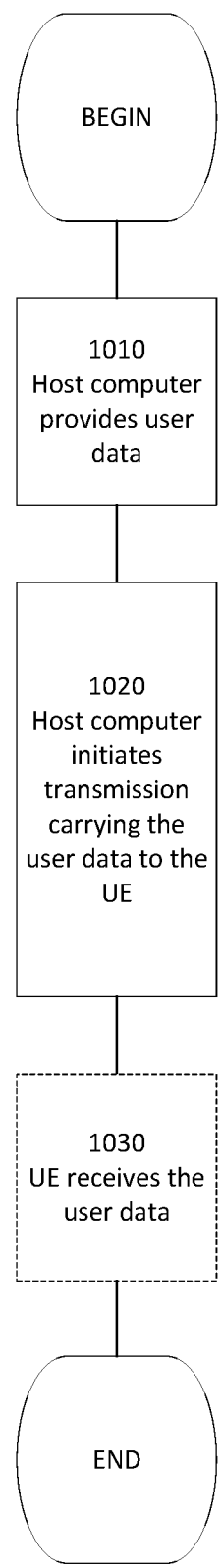
FIG. 10 is a flowchart illustrating a method implemented in a communication system, in accordance with an embodiment of the present disclosure.

FIG. 10 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
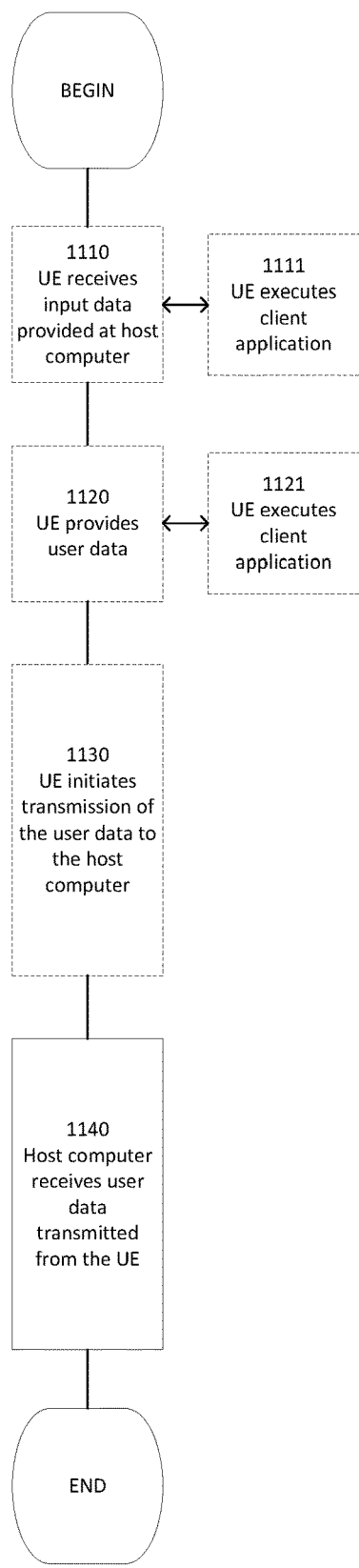
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

Figure 12:
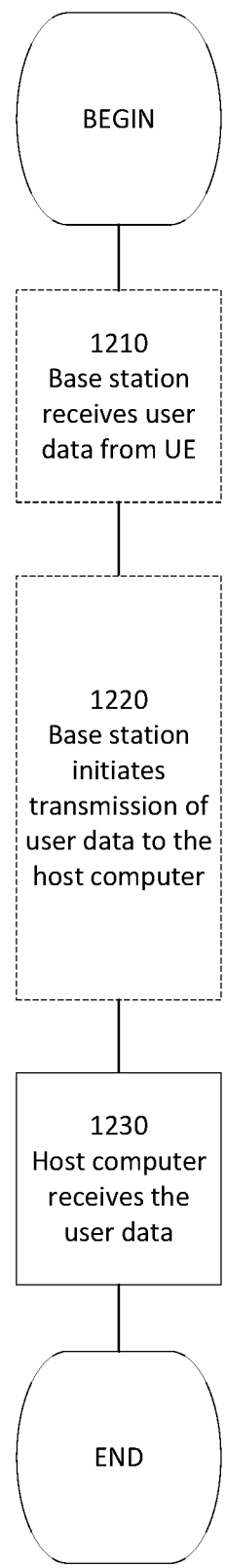
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the exemplary method 200 as describe with respect to FIG. 2.

According to some exemplary embodiments, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the exemplary method 200 as describe with respect to FIG. 2.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the exemplary method 100 as describe with respect to FIG. 1.

According to some exemplary embodiments, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the exemplary method 100 as describe with respect to FIG. 1.

According to some exemplary embodiments, there is provided a method implemented in a communication system which may include a host computer, a base station and a UE. The method may comprise, at the host computer, receiving user data transmitted to the base station from the UE which may perform any step of the exemplary method 100 as describe with respect to FIG. 1.

According to some exemplary embodiments, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the exemplary method 100 as describe with respect to FIG. 1.

According to some exemplary embodiments, there is provided a method implemented in a communication system which may include a host computer, a base station and a UE. The method may comprise, at the host computer, receiving, from the base station, user data originating from a transmission which the base station has received from the UE. The base station may perform any step of the exemplary method 200 as describe with respect to FIG. 2.

According to some exemplary embodiments, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the exemplary method 200 as describe with respect to FIG. 2.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

Hereinafter, the solutions will be further described as follows.

There are two main solutions that can help to reduce the issue with simultaneously required PUCCH resource for multicast PDSCH HARQ feedback. The two solutions have the commonality that via configuration, UEs in a multicast group are not required to send HARQ feedback for multicast PDSCH in the same UL slot, but instead sending HARQ feedback in different UL slots. The more UL slots that can be used to send HARQ feedback for the multicast group, the less the required PUCCH resource are needed at one specific slot.

Embodiment 1

This proposed solution has standard impact. Network will configure users in multicast group with a different HARQ feedback timing offset via RRC signaling and users with different HARQ feedback timing offset share the same PUCCH resource. Assuming there are 3 different values for HARQ feedback timing offset, 0, 1 and 2, gNB can divide all N users in a multicast group into 3 sub-groups with around equal nrof users N/3 and then configure each user in sub-group with different values. Then the nrof PUCCH resource need be configured for N user in PTM group is just N/3 instead of N. This is because users in different subgroup can then share the PUCCH resource as they do not need to transmit PUCCH in same slot.

Besides to configure each UE a concrete time offset to divide UE into different slots, there is another method to divide UE into different slots. That is, network configure all UE a single common value 'L' which is the maximum allowed time offset. Then there is a rule known at both gNB and UE about how to divide UE into different sub-group, i.e. using different time offset. This rule could be UE_ID mod L.

Then the PUCCH resource to configure is according to the maximum nrof users per slot.

When UE receives a multicast PDCCH, it will check this extra HARQ feedback timing offset, if it is 0, then UE will send HARQ feedback as it is specified in DCI in PDCCH. If it is 1, then UE will send HARQ feedback at the slot as specified in DCI in PDCCH plus 1 slot. If it is 2, then UE will send HARQ feedback at the slot as specified in DCI in PDCCH plus 2 slots.

In this way, users in a multicast group but in different sub-group will send HARQ feedback at different UL slot, then the required number of PUCCH at one specific timing is reduced.

Embodiment 2

This proposed solution is an implementation solution. NR standard already support PDSCH repetition via aggregated transmission. That is, via one scheduling instance, network will send N PDSCH with different redundancy version. (N can be 1, 2, 4, 8 in NR). UE is required to send HARQ feedback only after it has received all of the PDSCH aggregated transmissions.

Taking advantage of this feature, network can configure UEs in a multicast group with good radio link quality with less nrof transmissions in a PDSCH aggregation, UE in a multicast group with bad radio link quality more nrof transmissions in a PDSCH aggregation, then UE with good radio link quality will send HARQ feedback earlier compared to UE with bad radio link quality in a multicast group. Then the required PUCCH resource at one UL slot is reduced.

Of course, the radio link quality of each UE in multicast group could change, network can reconfigure the PDSCH aggregation factors for each UE in multicast group when it has noticed that the radio link quality has changed a lot.

Embodiment 3

When the received HARQ feedback is used by the network to decide whether a further retransmission is required, which is the conventional operation of HARQ, this puts severe time restrictions on when such HARQ feedback may be sent, which limits the possible extra delay that may be applied to embodiment 1.

However, with PDSCH aggregated transmission a UE is required to provide HARQ feedback only after Nth PDSCH transmission, i.e. up to N−1 retransmission will be executed automatically even there is no HARQ feedback. Then the necessity of HARQ feedback to trigger retransmissions is not that important, it may be used more as an input to a network feedback loop that controls the DL MCS selection together with other relevant information.

Then the extra delay that will be configured in embodiment 1 will not have big impact on network performance even when HARQ feedback is delayed using larger delay offsets. This means that the timing offset, described in Embodiment 1, may have a larger range and therefore achieve a larger subdivision of users into smaller groups using the same slots for the HARQ feedback, or allowing a higher total number of users in the group.

Therefore, network can configure the extra delay mentioned in embodiment 1 together with PDSCH aggregation. Either all UE in multicast group may use the same PDSCH aggregation factor, or different UE in multicast group use different PDSCH aggregation factors, when also Embodiment 2 is included.

Embodiment 4

Since UEs in multicast group experience different radio link quality, and network usually will send PDSCH according to the UE with the worst radio link quality, it is almost quite sure that UE with good radio link quality will receive PDSCH, therefore it is not necessary that they send HARQ feedback.

Then another embodiment is to configure some UE with very good radio link quality not to send HARQ feedback at all. For those that still need to send HARQ feedback, the embodiments above can be applied.

When such UEs, with initially very good radio link quality, move to worse radio conditions and start receiving erroneous data, they may inform the network via a higher layer message, such as e.g. an RLC NACK, that the data has not been correctly received. The network may then turn them into a HARQ feedback reporting mode of operation. Similarly, UEs with initially bad radio link quality, sending regular HARQ feedback, may inform the network via a higher layer message that the reception quality has improved, so that HARQ reporting is no longer needed. The network may then reconfigure the UE to stop sending HARQ.

Embodiment 5

In this embodiment, PDSCH aggregation can be combined with normal HARQ (re)transmission. That is, for each scheduling occasion, N aggregated PDSCH can be transmitted. After receiving the HARQ feedback, if it is NACK, another N aggregated PDSCH can be (re)transmitted again. UEs may be configured with different aggregation factors, meaning that the HARQ feedback would be provided at different times, which would spread the HARQ feedback in time in the same way as for PDSCH repetitions. Similar to Embodiment 3 UEs in good channel conditions can be configured with a lower aggregation factor, so they will report earlier than UEs with worse radio reception conditions.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method implemented at a terminal device in a PTM group, comprising:
   receiving a message from a network node, wherein the message indicates at least one of: delay information for a Hybrid Automatic Repeat reQuest (HARQ) feedback for a Point to Multipoint (PTM) transmission for the terminal device, a Physical Downlink Shared Channel (PDSCH) aggregation factor for the terminal device, and a HARQ feedback reporting mode for the PTM transmission for the terminal device; and
   determining whether to transmit the HARQ feedback for the PTM transmission based on the message, and/or determining timing information for transmitting the HARQ feedback for the PTM transmission based on the message,
   wherein the PDSCH aggregation factor comprises an integer P corresponding to a first radio link quality and/or an integer Q corresponding to a second radio link quality, wherein P is less than or equal to Q when the first radio link quality is better than the second radio link quality.

2. The method of claim 1, further comprising:
   transmitting the HARQ feedback for the PTM transmission to the network node, based on the at least one of the delay information, the PDSCH aggregation factor and the HARQ feedback reporting mode.

3. The method of claim 1, wherein the HARQ feedback reporting mode for the PTM transmission for the terminal device comprises transmitting or skipping transmission of the HARQ feedback for the PTM transmission for the terminal device.

4. The method of claim 1, further comprising:
   receiving the PTM transmission from the network node.

5. The method of claim 1, further comprising:
   receiving an indication for transmitting the HARQ feedback for the PTM transmission.

6. The method of claim 5, wherein the indication comprises PDSCH to HARQ feedback delay conveyed in Physical Downlink Control Channel, PDCCH.

7. The method of claim 5, wherein transmitting the HARQ feedback for the PTM transmission further based on the indication.

8. The method of claim 1, wherein the delay information comprises an offset, and/or the PDSCH aggregation factor comprises an integer N.

9. The method of claim 8, wherein the timing information is determined by the PDSCH to HARQ feedback delay indicated in the indication plus the offset indicated in the message.

10. The method of claim 9, wherein receiving the PTM transmission comprises receiving N PDSCH aggregated transmissions without a transmission of a HARQ feedback.

11. The method of claim 10, wherein transmitting the HARQ feedback for the PTM transmission based on the PDSCH aggregation factor comprises transmitting the HARQ feedback after the reception of the N PDSCH aggregated transmissions.

12. The method of claim 1, wherein the HARQ feedback reporting mode and/or the PDSCH aggregation factor is determined according to radio link quality of the terminal device.

13. The method of claim 12, wherein the radio link quality of the terminal device is determined according to Channel Quality Indicator, CQI, report from layer 1, L1, or feedback from a higher layer.

14. The method of claim 13, wherein the feedback from a higher layer comprises Radio link control, RLC, status report or Packet Data Convergence Protocol, PDCP, status report from layer 2, L2.

15. The method of claim 12, further comprising: receiving the message from a network node again, when the radio link quality of the terminal device changes.

16. The method of claim 12, further comprising: determining whether to transmit the HARQ feedback for the PTM transmission again, when the radio link quality of the terminal device changes.

17. The method of claim 1, wherein the delay information is for multiple terminal devices in a subset of the PTM group.

18. An apparatus implemented in a terminal device in a PTM group, comprising:
   one or more processors; and
   one or more memories comprising computer program codes,
   the one or more memories and the computer program codes configured to, with the one or more processors, cause the apparatus at least to:
   receive a message from a network node, wherein the message indicates at least one of: delay information for a Hybrid Automatic Repeat reQuest, (HARQ) feedback for a Point to Multipoint, (PTM) transmission for the terminal device, a Physical Downlink Shared Channel, (PDSCH) aggregation factor for the terminal device, and a HARQ feedback reporting mode for the PTM transmission for the terminal device; and
   determine whether to transmit the HARQ feedback for the PTM transmission based on the message, and/or determine timing information for transmitting the HARQ feedback for the PTM transmission based on the message, wherein the PDSCH aggregation factor comprises an integer P corresponding to a first radio link quality and/or an integer Q corresponding to a second radio link quality, wherein P is less than or equal to Q when the first radio link quality is better than the second radio link quality.

19. A method implemented at a network node, comprising:

generating a message indicating a Physical Downlink Shared Channel (PDSCH) aggregation factor for at least a first terminal device; and transmitting the message to at least the first terminal device, wherein the PDSCH aggregation factor comprises an integer P corresponding to a first radio link quality and/or an integer Q corresponding to a second radio link quality, wherein P is less than or equal to Q when the first radio link quality is better than the second radio link quality.

* * * * *